United States Patent

[11] 3,616,139

| [72] | Inventor | Peter Jones<br>221 Verde Oak Drive, Hollywood, Calif. 90028 |
|---|---|---|
| [21] | Appl. No. | 792,498 |
| [22] | Filed | Jan. 21, 1969 |
| [45] | Patented | Oct. 26, 1971 |

[54] MULTILAYERED THERMAL INSULATORS
1 Claim, 4 Drawing Figs.

[52] U.S. Cl..................................................... 161/68,
52/408, 52/615
[51] Int. Cl..................................................... B32b 3/12
[50] Field of Search........................................... 52/408,
615; 161/68, 69, 43, 139, 127, 135

[56] References Cited
UNITED STATES PATENTS

| 2,020,639 | 11/1935 | Grayson et al............... | 161/123 X |
| 2,839,442 | 6/1958 | Whitaker..................... | 161/69 X |
| 2,870,857 | 1/1959 | Goldstein..................... | 181/33 |
| 3,041,219 | 6/1962 | Steck.......................... | 161/127 X |
| 3,249,659 | 5/1966 | Voelker....................... | 156/436 X |

Primary Examiner—Harold Ansher
Assistant Examiner—Henry F. Epstein
Attorney—Nienow & Frater ABSTRACT: This invention relates to improvements in thermal insulators formed of multiple layers and which are arranged to take advantage of reflection while minimizing heat loss by conduction and affording high strength to oppose compressive and other forces. The embodiment illustrated comprises layers of material which form dead air cells separated, in the direction of thermal differential, by reflective coatings and layers. The walls that comprise the dead air cells of one layer are offset from the walls that comprise the dead air cells of another layer. In one embodiment the several layers are formed of honeycombed material. In another embodiment, the dead air cells of one layer are formed by honeycomb material and the dead air cells of other layers are formed by embossed reflective material.

PATENTED OCT 26 1971 3,616,139

INVENTOR.
PETER JONES
BY
Nimow & Frater
ATTORNEYS

MULTILAYERED THERMAL INSULATORS

This invention relates to improvement in multilayered thermal insulators and, in particular, it relates to multilayered, nonvacuum, thermal insulation utilizing reflection.

While the invention has broader application in that insulations embodying it are useful at any temperature range, the invention is particularly well adapted to the provision of insulations which are to be subjected rather uniformly to temperatures and temperature ranges such that the air entrapped in the insulation does not undergo extreme relative density changes at different areas of the insulating structure as an incident to temperature change.

One object of the invention is to provide an improved insulation for use in building structures. In this connection it is an object to provide an insulation which can form an element of the enclosing and dividing walls of the structures by becoming part of the structural element in the system sense. Thus it is an object to provide an insulating structure which, in addition to functioning as a thermal insulator, utilizes the same elements that accomplish the insulation function to provide the strength, rigidity and shape to permit employment of panels of the insulating structure as walls, floors and ceilings. A related object is to provide a structural panel which can be used in large size whereby to facilitate erection of building structures, which will have the strength required to serve functionally as an enclosing or dividing panel of a structure, and which will also provide effective and efficient thermal insulating qualities. Another object is to provide such a panel which will be sufficiently inexpensive to be competitive with conventional building and insulation materials and practice.

In general, the ability of a conventional panel to withstand deformation is increased by adding mass in the form of rigidizing structure in a way that multiplies the area of the paths for heat flow across the panel by construction. In the invention the thermal insulating elements are arranged so that they contribute to rigidity while minimizing the paths for conductive heat loss.

These and other objects and advantages of the invention, which will hereinafter appear, are realized in part by the provision of the composite thermal insulator of sandwich construction comprising at least three layers overlying one another, the center layer of which includes a reflective material and the two outer layers each including a plurality of cell walls engaged at their base with the center layer and defining a plurality of substantially dead air cells, the lines of engagement of the cell walls of one outer layer being offset, in the plane of the center layer, from the lines of engagement with that center layer of the walls of the other outer layer.

Figure 1:
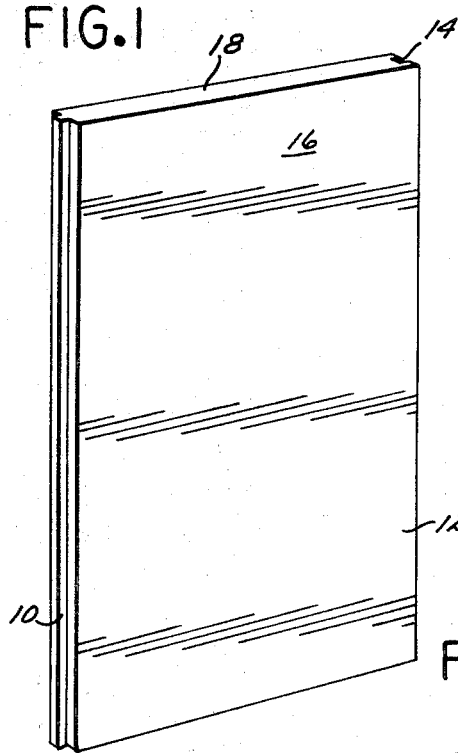
FIG. 1 is an isometric view of an insulating panel embodying the invention.

The insulating panel of FIG. 1 is a flat panel, generally rectangular in shape and including means by which one panel may be interfitted with adjacent panels. Advantageously, that means comprises a tongue and groove arrangement, as shown. The tongue 10 extends throughout the height of panel 12 along one edge and the groove 14 extends throughout the height of the panel at its opposite edge. The tongue member 10 and the groove member 14 serve as protective elements for the several layers of material which lie between the front face 16 of the panel and its rear face 20. The upper and lower edges of the panel are enclosed by strips of insulating material one of which is visible in FIG. 1 and is designated by the reference numeral 18.

Figure 2:
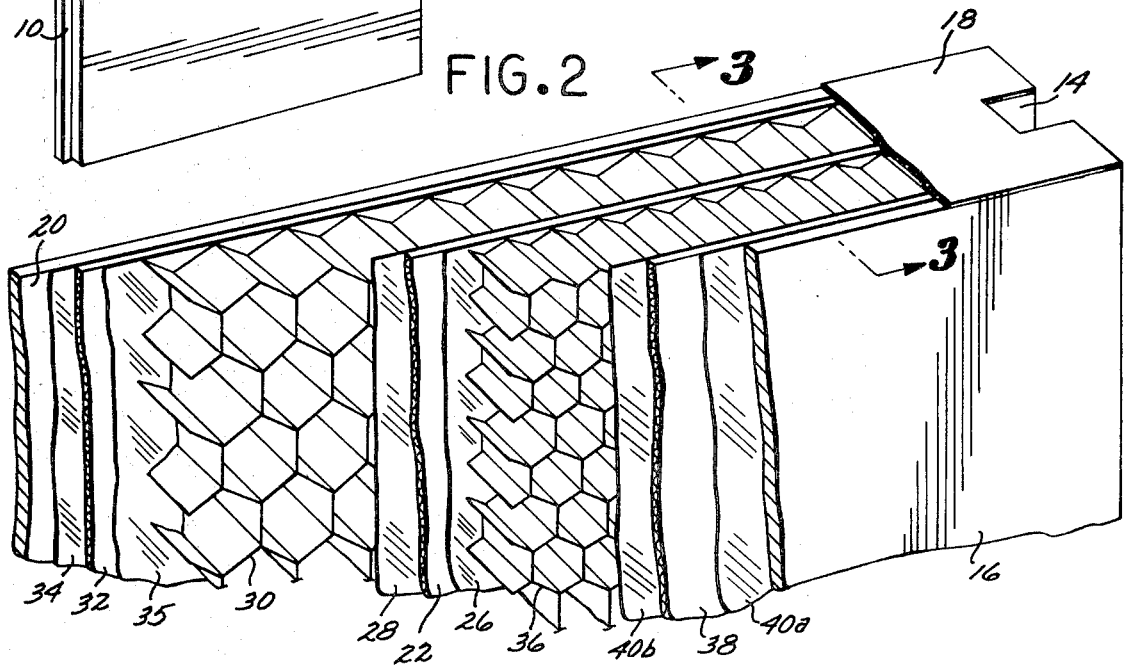
FIG. 2 is an isometric view of a fragment of the panel illustrated in FIG. 1 showing the several layers which are sandwiched together to form it.

As best shown in FIG. 2 the layer 18 is relatively thin lest it serve as a conductor of heat between the front face layer 16 and the rear face layer 20 of the panel. Panels made according to the invention are readily made sufficiently strong to enable their employment as part of the enclosing members on a building structure. Thus the panel 12 is sufficiently strong to serve as an outside wall or as a floor panel or as a roof panel of the dwelling house. It is also sufficiently strong to serve as the insulating panel within a truck body. The outer or facing sheets 16, 18 and 20 are selected according to the proposed use of the panel. Thus if the panel is to be used as an interior wall in a residential building these facing layers may be formed as thin sheets of wood and in this embodiment they do comprise a decorative wood. In a panel employed in a refrigerated truck the facing panels corresponding to panel 16 and 20 might be formed of metal whereby to provide a more rugged and durable surface. Thus the facing layers may comprise, but need not comprise, a material which is generally considered to be a conductor rather than an insulator of heat.

Interiorly of the facing layers of the insulating material is comprised of a series of layers including at least layers which are disposed on opposite sides of an intermediate dividing layer and which define a series of dead airspaces closely adjacent one to the other. The walls of these two layers which define those air spaces are laterally offset whereby the walls of one do not overlie in parallel relation the walls of the other. These layers are advantageously formed of a material whose walls define a honeycomb structure the openings of which extend in parallel one to the other and perpendicularly to the dividing layer between them. The openings of one layer are formed larger than the opening of the other so that the walls of one have greater separation than do the walls of the other whereby to preclude assembly so that the walls of one are all exactly opposite to the walls of the other. The intervening wall is secured to the two honeycomb layers so that relative motion between them in a direction parallel to the plane of the intervening layer is precluded. The other side of each of the honeycomb layers is secured to an overlying layer, again in a way that precludes relative motion between them in the direction of the plane immediately layer.

Both the intervening layer and the overlying layer are reflective. They are either made of a reflective material such as a sheet of aluminum or they are made of a layer of material which is aluminized or silvered or otherwise made reflective. In the embodiment illustrated the intervening layer, generally designated 22, comprises an inner layer of glassine paper which has a metallizing layer 26 coated upon one of its sides and a metallizing layer 28 coated upon the other of its sides. A layer 30 of honeycomb material overlies the metallizing layer 28 and is glued to it. At its other face of honeycomb layer 30 is glued to a layer of glassine paper 32 which is covered on both sides by metallizing layers 34 and 35. The glassine paper is glued to the facing layer 20 of wood by a glue interposed between the metallizing layer 34 and the wood. At the other side of the intervening layer 22 is a layer 36 of honeycomb material. The honeycomb size is substantially smaller than the size of the honeycomb structure of the layer 30. One tale of the honeycomb layer 36 is glued to the metallizing layer 26 and the other face of the honeycomb layer 36 is glued to a layer of glassine paper 38 which has a reflective layer on both sides, one 40a of which is glued to the wood face 16. The other reflective layer is designated 40b.

Figure 3:
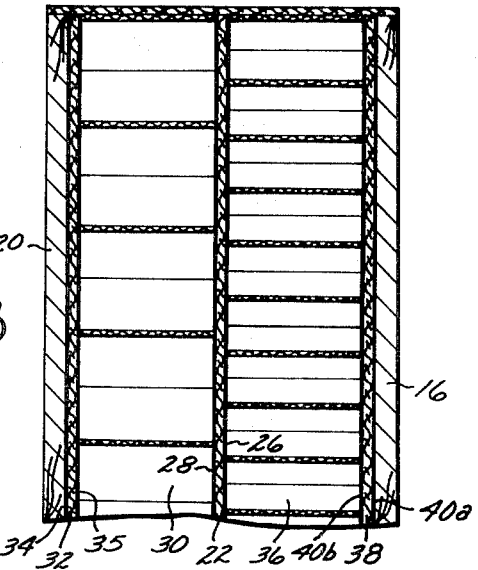
FIG. 3 is a cross-sectional view taken on line 3—3 of FIG. 2.

This multilayered construction is shown in end elevation in FIG. 3. The two honeycomb layers are shown to have substantially equal thickness. While this feature is not necessary it is advantageous in that it facilitates production by avoiding the need for storage and processing equipment to deal with layers of different thicknesses. Moreover, it is not essential that the honeycomb be six-sided, other numbers of sides being entirely satisfactory. Also, it is not essential that the two layers be formed of honeycomb material having the some number of sides.

Honeycomb construction is well known as a core material because it provides high strength and compression per unit weight and that advantage is realized in panels made according to the invention. But in the invention the honeycomb structure serves also to create dead airspaces which when combined with the reflective materials provides for a high order of insulation. The insulation quality is improved several fold without loss of the strength to resist compression by dividing the core into two layers of honeycomb construction. Inclusion of the intervening layer adds to that compressive strength and it adds very greatly to the ability of the panel to withstand shear forces in a plane of the panel and to resist compressive forces in the plane of the panel both lengthwise and across its width. Thus, the same construction that contributes to the insulating qualities of the panel serves also to strengthen it without unduly increasing cost or weight.

Figure 4:
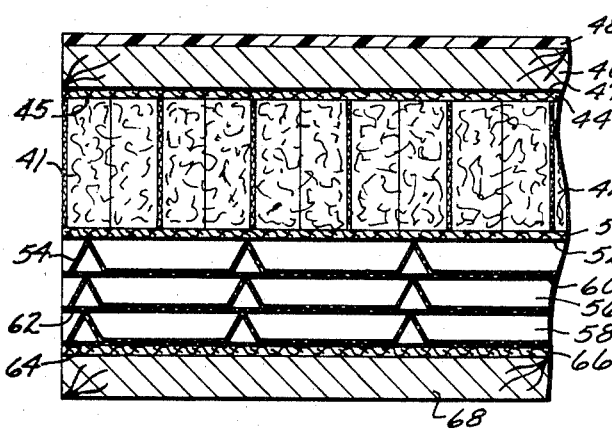
FIG. 4 is a cross-sectional view of a composite insulating panel of alternative design.

There is a limit, of course, to the number of honeycomb layers that can be sandwiches together within a panel of given thickness beyond which the addition of reflective layers is offset by the increase in conductive heat paths. When it is necessary to provide a better insulation within a given panel thickness much of the strength afforded by the honeycomb core construction can be preserved by using a core comprising a fewer number or only one honeycomb layer in series with a number of layers of embossed material either formed of reflective material or, advantageously, formed of a nonheat conductive material which is aluminized or otherwise coated with reflective material. An example of such an insulating structure is illustrated in FIG. 4. In this example, only one layer of honeycomb material is provided. That layer 42 is formed of a plastic. A layer of paper 44 is glued to its upper face, in FIG. 4. The paper is provided with a reflective coating on both sides, one side 45 of which is glued to the honeycomb layer 42 and the other side 47 of which is glued to the lower face of a thin sheet of wood 46 over which a decorative layer 48 has been laid. The lower face of the honeycomb layer 42 is glued to the metallic coating 50 of a layer of paper 52 which could as well be a thin veneer of wood or plastic. Below that is a layer 54 of embossed aluminized film. The embossing comprises a grid or lattice of inverted V-shaped walls which extend laterally, here upwardly, from the sheet to define a series of pockets separated by the lattice of walls. The upper edge of the wall is glued to the lower face of the aluminized paper layer 52 so that the pockets are sealed and each pocket becomes a dead air cell. Three such layers are employed in the insulating structure of FIG. 4. The uppermost layer is designated by the reference numeral 54, the next down is designated 56, and the lower one is designated 58. A flat sheet of aluminum 60 separates the embossed layers 54 and 56 and a flat sheet of aluminum 62 separates the embossed layers 56 and 58. The lower embossed layer is glued to the reflective layer 64 of a paper sheet 66 which is itself glued to a sheet of wood 68. The cells of the several embossed layers have the same shape and size and are arranged with their walls overlying one another to maximize the compressive strength of the structure.

The air in a dead airspace is capable of conducting heat and the air in the cells of the honeycomb layers will provide a path for some heat loss by conduction. Certain materials are less conductive than air and these may be placed in the cells to reduce such loss. If such materials have a compressive strength less than that of the honeycomb walls, then their dimensions should be equal to or less than the thickness of the honeycomb layer lest they reduce the compressive strength of the composite structure. Spun glass fibers very loosely packed or other similar materials are an example of a suitable core filler. In the embodiment of FIG. 4, the layer 42 is spun glass filled, the glass being designated by the reference numeral 41.

Although I have shown and described certain specific embodiments of my invention, I am fully aware that many modifications thereof are possible. My invention, therefore, is not to be restricted except insofar as is necessitated by the prior art and by the spirit of the appended claims.

1. A composite thermal insulator of sandwich construction including at least three layers overlying one another;

the intermediate layer comprising a metallic, heat-reflective material;

the other two layers each being formed of a honeycomb network of nonmetallic, insulating material having its walls secured to said intermediate layer and extending substantially normally therefrom;

the walls of one honeycomb network being offset, in the plane of the intermediate layer, from the walls of the other honeycomb network; and in which the cells of said one honeycomb network contain an insulating material less thermally conductive than air, said insulating material having dimensions no greater than the width of said walls across said sandwich construction whereby the width of said sandwich construction is determined by the width and strength of said walls.

* * * * *